(12) United States Patent
Kimura

(10) Patent No.: US 11,722,605 B2
(45) Date of Patent: Aug. 8, 2023

(54) INSPECTING PRINT QUALITY OF PRINT PRODUCT BY CONTROLLING REGISTRATION OF IMPORTED REFERENCE IMAGE ADJUSTED OR NOT BASED ON PRINT JOB INFORMATION AND CONFIGURATION OF PRINTING APPARATUS

(71) Applicant: CANON KABUSHIKI KAISHA, Tokyo (JP)

(72) Inventor: Yusuke Kimura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/889,628

(22) Filed: Aug. 17, 2022

(65) Prior Publication Data

US 2023/0069620 A1 Mar. 2, 2023

(30) Foreign Application Priority Data

Aug. 24, 2021 (JP) .................................. 2021-136389

(51) Int. Cl.
*H04N 1/00* (2006.01)

(52) U.S. Cl.
CPC ....... *H04N 1/00045* (2013.01); *H04N 1/00015* (2013.01); *H04N 1/00082* (2013.01); *H04N 1/00575* (2013.01); *H04N 1/00633* (2013.01)

(58) Field of Classification Search
None
See application file for complete search history.

(56) References Cited

U.S. PATENT DOCUMENTS

| 10,607,336 | B2 | 3/2020 | Honma | |
|---|---|---|---|---|
| 11,451,674 | B2* | 9/2022 | Igarashi | H04N 1/00045 |
| 11,580,632 | B2* | 2/2023 | Iwano | H04N 1/00034 |
| 2022/0269448 | A1* | 8/2022 | Kashiwagi | G06F 3/1208 |
| 2022/0391151 | A1* | 12/2022 | Matsuyama | G06F 3/1208 |
| 2023/0068383 | A1* | 3/2023 | Miyahara | H04N 1/00015 |

FOREIGN PATENT DOCUMENTS

JP 2019077054 A 5/2019

* cited by examiner

*Primary Examiner* — Scott A Rogers
(74) *Attorney, Agent, or Firm* — ROSSI, KIMMS & McDOWELL LLP

(57) ABSTRACT

A first inspection apparatus registers an image scanned from a print product printed by a first printing apparatus as a first reference image, and registers information of a print job related to printing of the image with the image and first configuration information indicating configuration of the first printing apparatus. A second inspection apparatus imports the first reference image registered in the first inspection apparatus and registers the imported first reference image as the second reference image. Based on information of the print job registered with the first reference image, the first configuration information, and the second configuration information indicating the configuration of the second printing apparatus, it is controlled whether the first reference image is registered as the second reference image by reversing a front and back of the first reference image or as the second reference image without reversing the front and back of the first reference image.

8 Claims, 14 Drawing Sheets

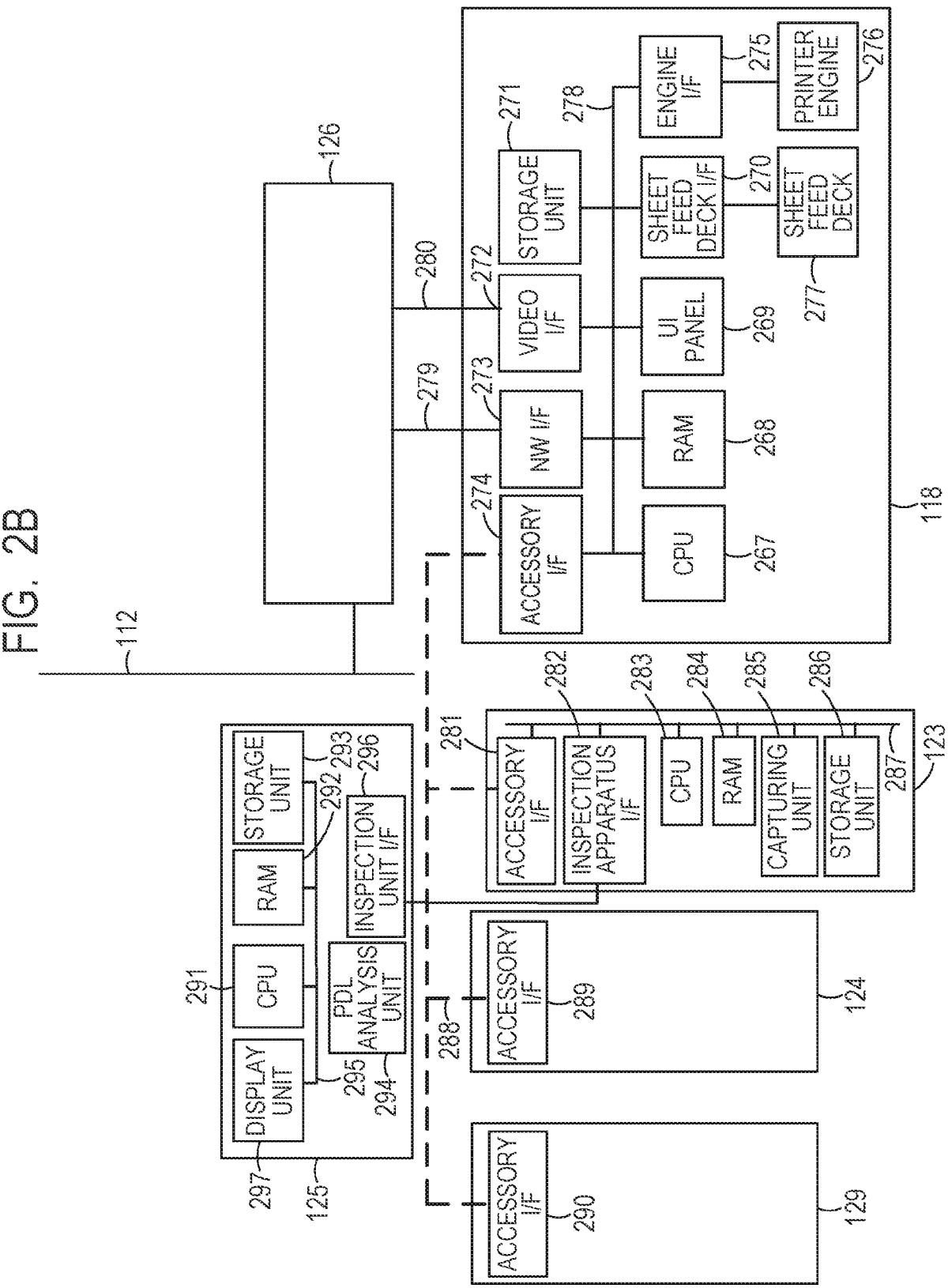

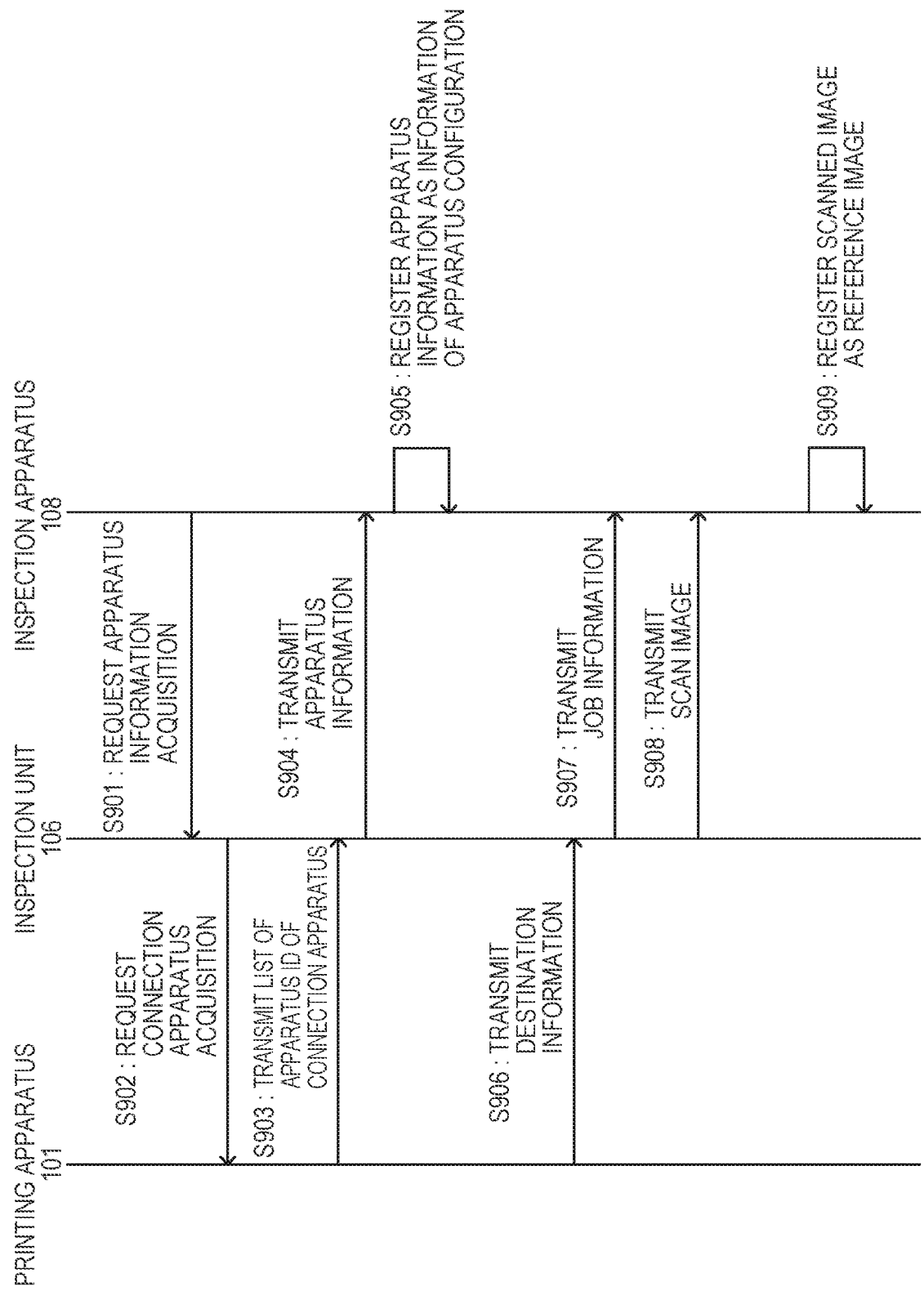

| APPARATUS ID | APPARATUS NAME |
|---|---|
| 1 | INSPECTION UNIT |
| 2 | LARGE CAPACITY STACKER |
| 3 | STAPLING APPARATUS |
| 4 | RELAY APPARATUS |
| 5 | POST PROCESSING APPARATUS |

1002

1003

| DISCHARGE TRAY ID | DISCHARGE TRAY NAME |
|---|---|
| 1 | TOP TRAY |
| 2 | MAIN TRAY |
| 3 | TRAY 1 |
| 4 | TRAY 2 |
| 5 | TRAY OF POST PROCESSING APPARATUS |

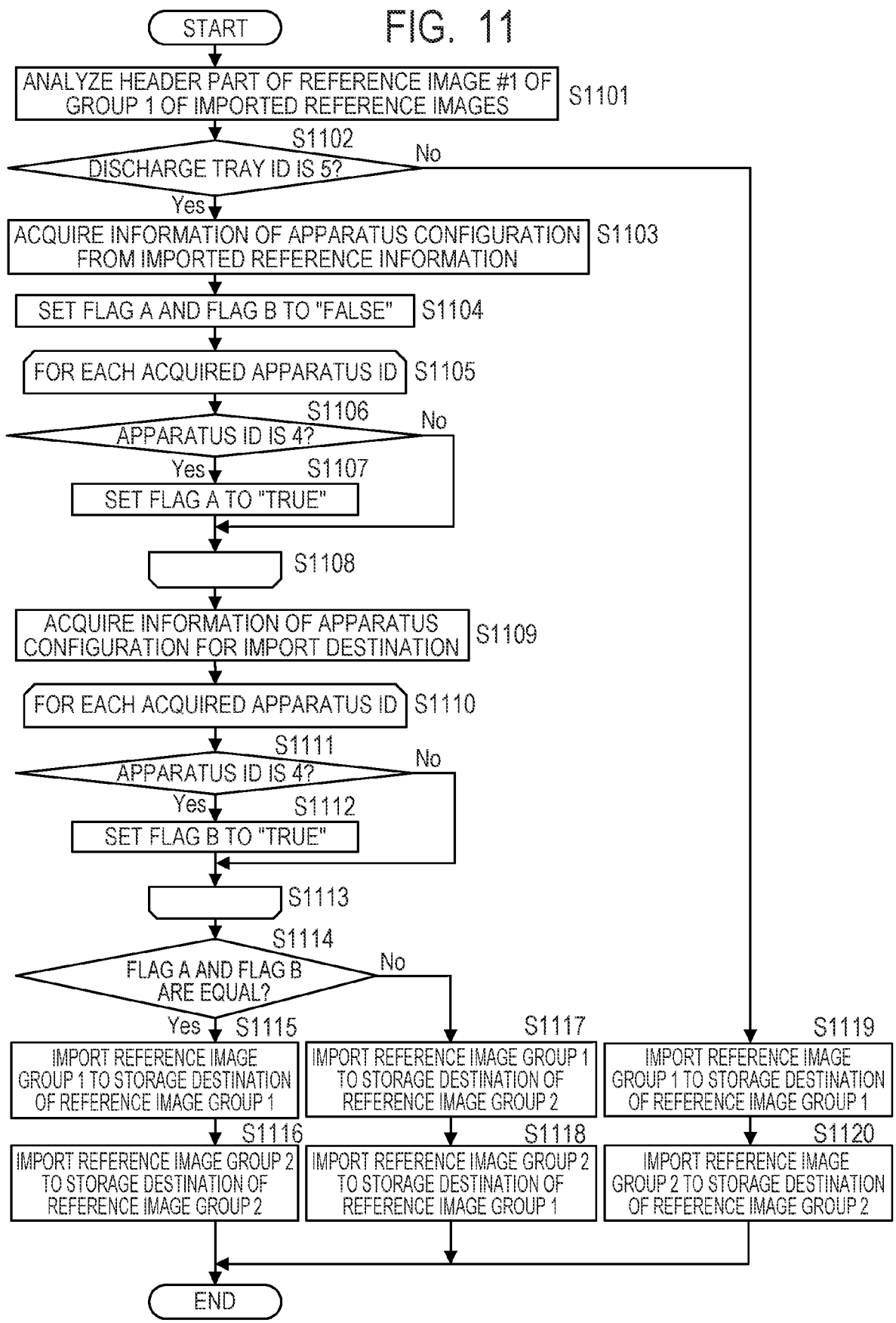

INSPECTING PRINT QUALITY OF PRINT PRODUCT BY CONTROLLING REGISTRATION OF IMPORTED REFERENCE IMAGE ADJUSTED OR NOT BASED ON PRINT JOB INFORMATION AND CONFIGURATION OF PRINTING APPARATUS

BACKGROUND OF THE INVENTION

Field of the Invention

The present invention relates to an inspection system, an inspection apparatus, a control method of the inspection system, and a storage medium for inspecting print quality of print products in a printing apparatus.

Description of the Related Art

There is known an inspection apparatus which reads a print product printed by a printing apparatus and inspects print quality. The inspection apparatus is capable of detecting image defects such as stains and missing prints, character errors, print quality of barcode, and the like. These defect-detected products are separated from the defect-free print products by, for example, setting a sheet discharge destination different from the discharge destination where the defect-free products are discharged. In order to perform the inspection by the inspection apparatus, it is necessary to register in advance a reference image that serves as a reference of the defect-free print product.

In an environment where there are a plurality of printing apparatuses, when an additional order of printing is received, printing may be performed by a printing apparatus different from the previous one depending on an operation status of the apparatus, a delivery date of the received printed product, and the like. In this case, the user needs to re-register the reference image. In order to avoid the trouble of re-registering the reference image, a technique has been proposed in which a reference image created by one inspection apparatus is imported into another inspection apparatus for inspection (Japanese Patent Application Laid-Open No. 2019-77054).

However, even if the reference image is imported, there are cases where the printing surface changes before passing through the inspection apparatus due to a difference in the apparatus configuration of the printing apparatus between the import source and the import destination. In such a case, according to the prior art, the imported reference image and the captured image obtained by capturing the printed product do not match, and are detected as defects. Therefore, it is necessary for the user to re-register the reference image, and there is a problem that re-registering takes time and effort.

Note that there may be a notification technique for prompting the user to confirm contents of the reference image registration or to re-register the reference image if the apparatus configuration of the printing apparatus is different between the import destination and the import source. However, even if a notification for re-registering is issued, since the user re-registers the reference image, re-registering takes time and effort.

The present invention has been made to solve the above problems. An object of the present invention is to provide a scheme whereby a reference image can be automatically adjusted according to an apparatus configuration of an import destination when the reference image is imported, and a user can inspect the reference image without reregistering the reference image.

SUMMARY OF THE INVENTION

According to an aspect of the present invention, an inspection system comprises a first inspection apparatus comprising a memory and at least one first processor in communication with the memory, wherein the at least one first processor is configured to perform inspecting print quality of a first print product based on a comparison between a first image scanned from the first print product printed by a first printing apparatus and a first reference image and a second inspection apparatus comprising a memory and at least one second processor in communication with the memory, wherein the at least one second processor is configured to perform inspecting print quality of a second print product based on a comparison between a second image scanned from the second print product printed by a second printing apparatus and a second reference image, wherein the at least one first processor is configured to perform first registering information of print job related to printing of the first image with the first image and first configuration information indicating configuration of the first printing apparatus when the first image scanned from the first print product printed by the first printing apparatus is registered as the first reference image, wherein the at least one second processor is configured to perform second registering the second reference image by importing the first reference image registered in the first inspection apparatus, and wherein the at least one second processor is configured to perform controlling whether the first reference image is registered as the second reference image by reversing a front and back of the first reference image or registered as the second reference image without reversing the front and back of the first reference image based on the information of the print job with the first image and second configuration information indicating configuration of the second printing apparatus.

Further features of the present invention will become apparent from the following description of exemplary embodiments with reference to the attached drawings.

BRIEF DESCRIPTION OF THE DRAWINGS

FIG. 2B illustrates the control configuration diagram of the printing apparatus, the inspection apparatus, the information processing apparatus, and other apparatuses according to the present embodiment.

FIG. 9 illustrates a timing chart between the printing apparatus, the inspection apparatus, and the inspection unit when registering the reference image for inspection in the present embodiment.

FIG. 10A illustrates information of apparatus configuration and reference information in the present embodiment.

FIG. 11 illustrates a flowchart of an operation performed when the reference information of the inspection is imported into the inspection apparatus in the present embodiment.

DESCRIPTION OF THE EMBODIMENTS

Hereinafter, an embodiment of the present invention will be described with reference to the drawings. Unless otherwise specified, the present invention can be applied to either an inspection apparatus comprising a single apparatus or a plurality of apparatuses as long as the functions of the present invention are realized. Further, if the function of the present invention is realized, the present invention can be applied even to an inspection apparatus which is connected and processed through a network such as a LAN (Local Area Network) or WAN (Wide Area Network). That is, the system configuration in which the various terminals described in the following embodiments are connected is an example, and it goes without saying that there are various configuration examples depending on applications and purposes.

Figure 1:
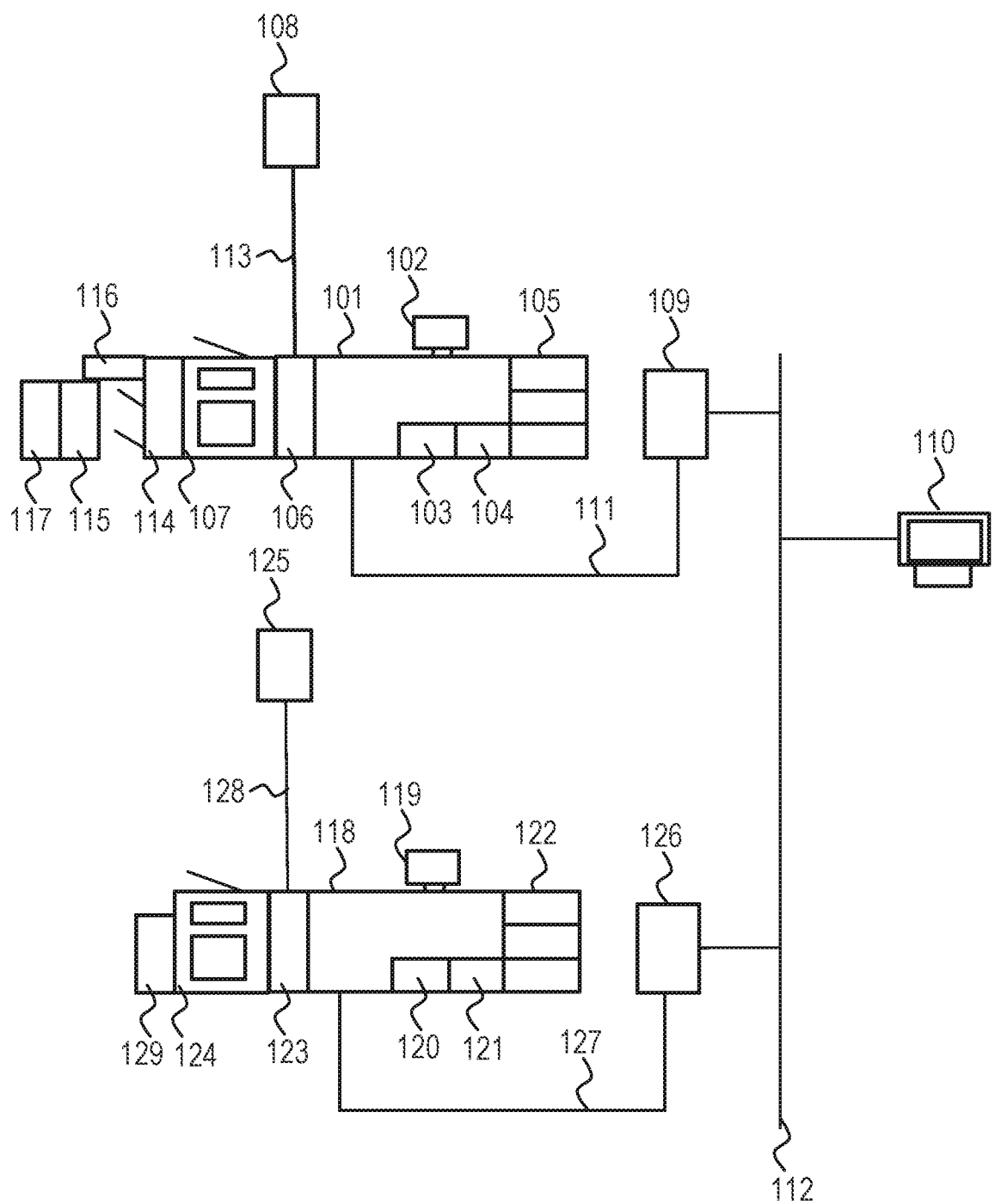
FIG. 1 illustrates a schematic diagram of an inspection system of the present embodiment.

FIG. 1 illustrates a schematic diagram of an example of an information processing apparatus, an inspection apparatus, a printing apparatus, a configuration of other apparatuses, and an inspection system comprising these apparatuses. Although the printing apparatus of the present embodiment will be described using an electrophotographic printing apparatus, the printing apparatus of the present embodiment may be a printing apparatus of a different image forming method such as an inkjet method or an offset method. In the present embodiment, an inspection apparatus 108 and related apparatuses for registering the reference image, and an inspection apparatus 125 and related apparatuses to which a reference image is imported are described.

A printing apparatus 101 is connected to an information processing apparatus 109 via a cable 111. The information processing apparatus 109 is connected to a client computer 110 via a network 112.

The printing apparatus 101 includes a UI panel 102, a sheet feed deck 103, and a sheet feed deck 104. The printing apparatus 101 is connected to an option deck 105 consisting of three stages of sheet feeding decks. The printing apparatus 101 is, for example, an electrophotographic printing apparatus (image forming apparatus). The UI panel 102 is a user interface provided with a capacitive touch panel, for example.

Further, the printing apparatus 101 includes an inspection unit 106, a large-capacity stacker 107, a stapling apparatus 114, a relay apparatus 115, and a post-processing apparatus 117. The inspection unit 106 is connected to the inspection apparatus 108 via a cable 113. The large-capacity stacker 107 is provided with a main tray and a top tray, and thousands of sheets of paper can be loaded on the main tray at a time. The stapling apparatus 114 is provided with a tray 1 and a tray 2, and a stapled product can be loaded on the tray.

The relay apparatus 115 is a device for relaying a sheet conveying path between the stapling apparatus 114 and the post-processing apparatus, and does not have a tray. The relay apparatus 115 has a reversing mechanism in the sheet conveying path, and has a function of reversing the sheet to be conveyed and changing the printing surface. A relay sub-apparatus 116 is a subordinate apparatus of the relay apparatus 115, and is an apparatus for conveying a sheet conveyed from the stapling apparatus 114 to the relay apparatus 115. The relay sub-apparatus 116 is controlled by the relay apparatus 115. This relay apparatus connects both the stapling apparatus 114 and the post-processing apparatus 117 so that the respective processing functions can be used. The post-processing apparatus 117 is a general-purpose post-processing apparatus, such as a ring binder or a booklet maker.

A print job is generated by the client computer 110, transmitted to the information processing apparatus 109 via the network 112, and managed by the information processing apparatus 109. The print job is transmitted from the information processing apparatus 109 to the printing apparatus 101 via the cable 111, and the printing apparatus 101 performs printing on a sheet. The printed sheet passes through the inspection unit 106, the large-capacity stacker 107, the stapling apparatus 114, the relay sub-apparatus 116, and the relay apparatus 115, and is processed by the post-processing apparatus 117 to produce a print product. The inspection apparatus 108 inspects the print quality of the printed product based on a comparison between an image scanned from the print product printed by the printing apparatus 101 and the reference image registered in the inspection apparatus 108 itself.

A printing apparatus 118 is connected to an information processing apparatus 126 via a cable 127. The information processing apparatus 126 is connected to the client computer 110 via the network 112. The printing apparatus 118 includes a UI panel 119, a sheet feed deck 120, and a sheet feed deck 121. The printing apparatus 118 is connected to an option deck 122 consisting of three stages of paper feeding decks. The printing apparatus 118 is, for example, an electrophotographic printing apparatus. The UI panel 119 is a user interface provided with a capacitive touch panel, for example.

The printing apparatus 118 further includes an inspection unit 123, a large-capacity stacker 124, and a post-processing apparatus 129. The inspection unit 123 is connected to the inspection apparatus 125 via a cable 128. The large-capacity stacker 124 is provided with a main tray and a top tray, and thousands of sheets of paper can be loaded in the main tray at a time. The post-processing apparatus 117 is a general-purpose post-processing apparatus, such as a ring binder or a booklet maker.

The print job is generated by the client computer 110, transmitted to the information processing apparatus 126 via the network 112, and managed by the information processing apparatus 126. The print job is transmitted from the information processing apparatus 126 to the printing apparatus 118 via the cable 127, and the printing apparatus 118 performs printing on a sheet. The printed sheet passes through the inspection unit 123 and the large-capacity stacker 124, and is processed by the post-processing apparatus 129 to produce a print product. The inspection apparatus 125 inspects the print quality of the print product based on a comparison between an image scanned from the print product printed by the printing apparatus 118 and the reference image registered in the inspection apparatus 125 itself.

The client computer 110, the information processing apparatus 109, and the inspection apparatus 108 may be connected to the cable 111 to communicate with the printing apparatus 101. That is, the connection configurations of the printing apparatus 101, the information processing apparatus 109, and the client computer 110 shown in the present embodiment are examples, and there are various connection configurations other than those shown in the present embodiment. The same applies to the client computer 110, the information processing apparatus 126, and the inspection apparatus 125.

Figure 2A:
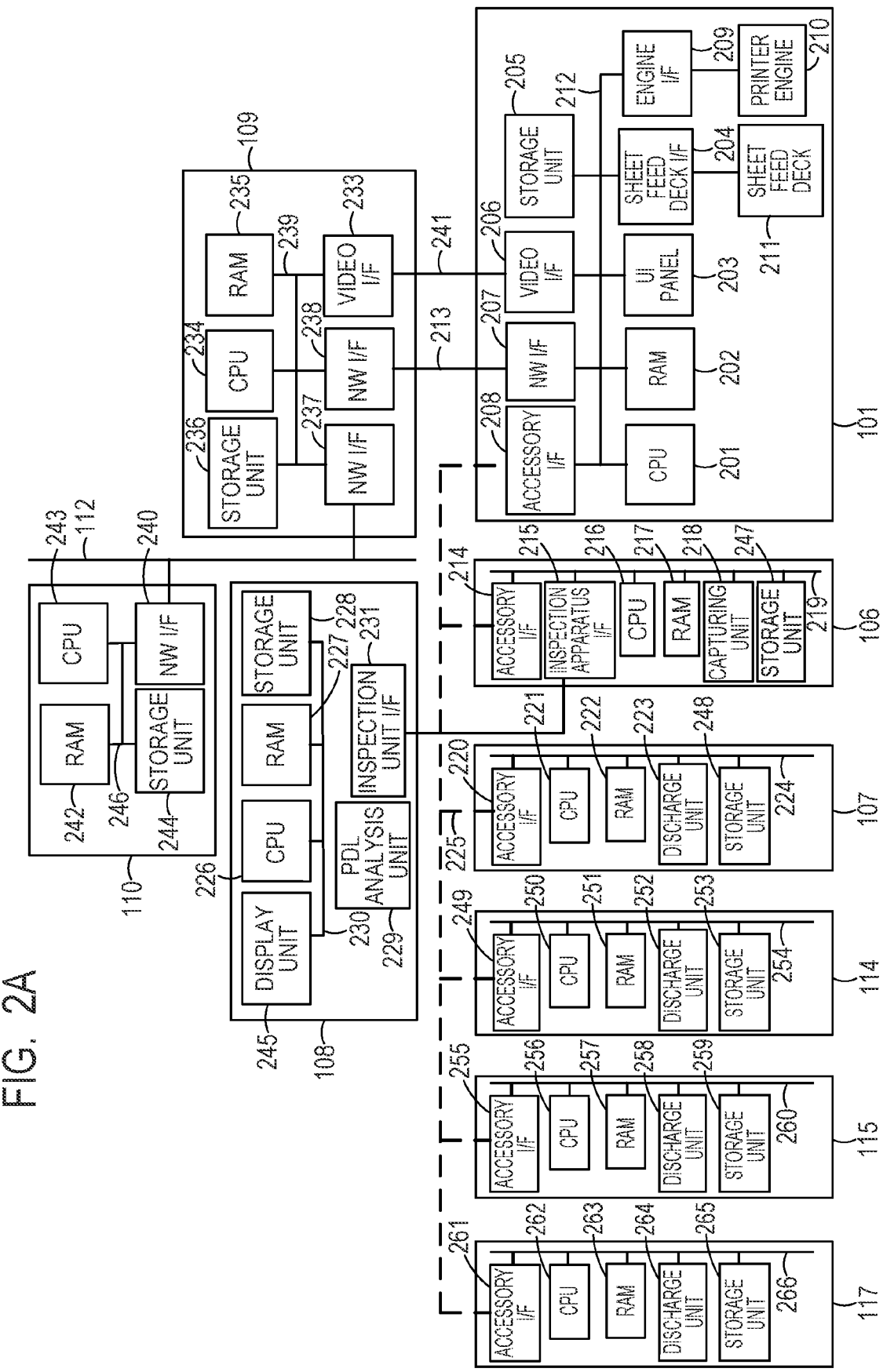
FIG. 2A illustrates a control configuration diagram of a printing apparatus, an inspection apparatus, an information processing apparatus, and other apparatuses according to the present embodiment.

FIG. 2A and FIG. 2B illustrate block diagrams of control configurations of the printing apparatus 101, the inspection apparatus 108, the information processing apparatus 109, and other apparatuses according to the present embodiment. Hereinafter, FIG. 2A and FIG. 2B are collectively described as FIG. 2.

First, the printing apparatus 101 will be described. A central processing unit (CPU) 201 controls and calculates each section of the printing apparatus 101 via a system bus 212. The CPU 201 controls the execution of a program stored in a storage unit 205 and loaded into a RAM (Random Access Memory) 202. The RAM 202 is a type of general volatile storage device directly accessible from the CPU 201, and is used as a work area of the CPU 201 or other temporary data storage area. The storage unit 205 stores control programs and data, and functions as a temporary storage area and a work memory during the operation of the printing apparatus 101.

An engine I/F 209 is used for communications with a printer engine 210 to control the print engine 210. The sheet feed deck I/F 204 is used for communications with a sheet feed deck 211 to control the sheet feed deck 211. The sheet feed deck 211 is generally referred to as a hard structure of the sheet feed decks 103, 104 and the option deck 105. A UI panel 203 is a hard structure of the UI panel 102, and is a user interface for performing general operations of the printing apparatus 101. In this embodiment, the UI panel 203 is provided with a capacitive touch panel.

A network interface (NW I/F) 207 is connected to a NW I/F 238 of the information processing apparatus 109 via a cable 213, and used for communications between the information processing apparatus 109 and the printing apparatus 101. In this example, the interfaces connected to the system buses 212 and 239 are directly connected to each other, but the information processing apparatus 109 and the printing apparatus 101 may be connected by a network, for example, and the connection type is not limited. A video I/F 206 is connected to a video I/F 233 via a video cable 241 and used for communications of image data between the information processing apparatus 109 and the printing apparatus 101. In FIG. 1, the cable 213 and the video cable 241 are combined and shown as the cable 111.

The connection interface between the information processing apparatus 109 and the printing apparatus 101 may be of a form integrating the functions of the NW I/F 238 and the video I/F 233. The connection interface with the information processing apparatus 109 in the printing apparatus 101 may be of a form integrating the functions of the NW I/F 207 and the video I/F 206.

An accessory I/F 208 is connected to an accessory I/F 214, an accessory I/F 220, an accessory I/F 249, an accessory I/F 255, and an accessory I/F 261 through a cable 225. That is, the printing apparatus 101 communicates with the inspection unit 106, the large-capacity stacker 107, the stapling apparatus 114, the relay apparatus 115, and the post-processing apparatus 117 via the accessory I/Fs 208, 214, 220, 249, 255, and 261.

Next, the inspection unit 106 will be described. A CPU 216 controls and calculates each section of the inspection unit 106 via a system bus 219, and executes a program stored in a storage unit 247 and loaded into a RAM 217. The RAM 217 is a type of general volatile storage device directly accessible from the CPU 216, and is used as a work area of the CPU 216 or other temporary data storage area. The storage unit 247 stores control programs and data, and functions as a temporary storage area and a work memory during the operation of the inspection device.

An inspection apparatus I/F 215 is connected to an inspection unit I/F 231 through the cable 113. That is, the inspection unit 106 communicates with the inspection apparatus 108 via the inspection apparatus I/F 215 and the inspection unit I/F 231. A capturing unit 218 has a photographing function equipped with, for example, a conductor image sensor (hereinafter CIS), captures a sheet passing through the inspection unit, and transmits the captured image to the inspection apparatus 108 via the inspection apparatus I/F 215. The CIS for the capturing unit 218 is an example of a sensor, and may be another type of sensor such as a CCD image sensor, and the imaging method thereof is not limited.

Next, the large-capacity stacker 107 will be described. A CPU 221 controls and calculates each section of the large-capacity stacker 107 via a system bus 224, and executes a program stored in a storage unit 248 and loaded into a RAM 222. The RAM 222 is a type of general volatile storage device directly accessible from the CPU 221, and is used as a work area of the CPU 221 or other temporary data storage area.

The storage unit 248 stores control programs and data, and functions as a temporary storage area and a work memory during the large-capacity stacker operation. A discharge unit 223 controls the sheet discharge operation to the main tray and the top tray, and the monitoring and control of the loading conditions of the main tray and the top tray.

Next, the inspection apparatus 108 will be described. A CPU 226 controls and calculates each section of the inspection apparatus 108 via the system bus 230, and executes a program stored in a storage unit 228 and loaded into a RAM 227. The RAM 227 is a type of general volatile storage device directly accessible from the CPU 226, and is used as a work area of the CPU 226 or other temporary data storage area. The storage unit 228 stores control programs and data, and functions as a temporary storage area and a work memory during the operation of the inspection apparatus 108.

A PDL analysis unit 229 reads PDL data such as PDF, PostScript, PCL, and the like, received from the client computer 110 or the information processing apparatus 109 and executes interpretation processing. A display unit 245 is, for example, a liquid crystal display connected to the inspection apparatus, and receives a user input for the inspection apparatus and displays a state of the inspection apparatus. The inspection apparatus 108 may be provided with an NW I/F to be connected to the network 112.

Next, the information processing apparatus 109 will be described. A CPU 234 controls and calculates each section of the information processing apparatus 109 via a system bus 239, and executes a program stored in a storage unit 236 and loaded into a RAM 235. The RAM 235 is a type of general volatile storage device directly accessible from the CPU 234, and is used as a work area of the CPU 234 or other temporary data storage area.

The storage unit 236 stores control programs and data, and functions as a temporary storage area and a work memory during the operation of the information processing apparatus. A NW I/F 237 is connected to NW I/Fs 232 and 240 via a network. The information processing apparatus 109 communicates with the inspection apparatus 108 via the NW I/F 237 and the NW I/F 232. The information processing apparatus 109 communicates with the client computer 110 via the NW I/F 237 and the NW I/F 240.

Next, the client computer 110 will be described. A CPU 243 controls and calculates each section of the client computer 110 via a system bus 246, and executes a program stored in a storage unit 244 and loaded into the RAM 242. The RAM 242 is a type of general volatile storage device directly accessible from the CPU 243, and is used as a work area of the CPU 243 or other temporary data storage area. The storage unit 244 stores control programs and data, and functions as a temporary storage area and a work memory during the operation of the client computer.

Next, the stapling apparatus 114 will be described. A CPU 250 controls and calculates each section of the stapling apparatus 114 via a system bus 254, and executes a program stored in a storage unit 253 and loaded into a RAM 251. The RAM 251 is a type of general volatile storage device directly accessible from the CPU 250, and is used as a work area of the CPU 250 or other temporary data storage area.

The storage unit 253 stores control programs and data, and functions as a temporary storage area and a work memory during the operation of the stapling device. The discharge unit 252 controls the paper discharge operation to the tray 1 and the tray 2, and the monitoring and control of the loading conditions of the tray 1 and the tray 2.

Next, the relay apparatus 115 will be described. The CPU 256 controls and calculates each section of the relay apparatus 115 via a system bus 260, and executes a program stored in a storage unit 259 and loaded into a RAM 257. The RAM 257 is a type of general volatile storage device directly accessible from the CPU 256, and is used as a work area of the CPU 256 or other temporary data storage area.

The storage unit 259 stores control programs and data, and functions as a temporary storage area and a work memory during the operation of the relay apparatus. A discharge unit 258 controls paper conveyance of the relay sub-apparatus 116, and sheet conveyance and reversal in the relay apparatus 115.

Next, the post-processing apparatus 117 will be described. A CPU 262 controls and calculates each section of the post-processing apparatus 117 via a system bus 266, and executes a program stored in a storage unit 265 and loaded into a RAM 263. The RAM 263 is a type of general volatile storage device directly accessible from the CPU 262, and is used as a work area of the CPU 262 or other temporary data storage area.

The storage unit 265 stores control programs and data, and functions as a temporary storage area and a work memory during operation of the post-processing apparatus. The discharge unit 264 controls sheet conveyance control and post-processing processing such as ring binding and bookbinding.

Next, the printing apparatus 118, the inspection unit 123, the large-capacity stacker 124, the inspection apparatus 125, the information processing apparatus 126, and the post-processing apparatus 129 will be described.

Since components 267 to 278 constituting the printing apparatus 118 are the same as those of the printing apparatus 101, descriptions thereof will be omitted. A cable 279 is a cable connecting a NW I/F 273 of the printing apparatus 118 and the NW I/F of the information processing apparatus 126. A video cable 280 is a cable connecting a video I/F 272 of the printing apparatus 118 and the video I/F of the information processing apparatus 126. In FIG. 1, the cable 279 and the video cable 280 are combined and shown as the cable 127.

Since components 281 to 287 constituting the inspection unit 123 are the same as those of the inspection unit 106, descriptions thereof will be omitted. Since the components constituting the large-capacity stacker 124 are the same as those of the large-capacity stacker 107, only an accessory I/F 289 necessary for the description of the present embodiment is described in FIG. 2. Other components are omitted from description and description in FIG. 2. The accessory I/F 289 is the same as the accessory I/F 220.

Since the inspection apparatus 125 is the same as that of the inspection apparatus 108, descriptions for components 291 to 297 will be omitted. The inspection apparatus 125 may be provided with an NW I/F to be connected to the network 112. Since the components constituting the information processing apparatus 126 are the same as those of the information processing apparatus 109, descriptions in FIG. 2 are omitted. Since the components constituting the post-processing apparatus 129 are the same as those of the post-processing apparatus 129, only the accessory I/F 290 necessary for the description of the present embodiment is described in FIG. 2. Other components are omitted from the descriptions of FIG. 2. The accessory I/F 290 is the same as the accessory I/F 261.

The accessory I/F 274 is connected to the accessory I/F 281, the accessory I/F 289, and the accessory I/F 290 through a cable 288. That is, the printing apparatus 118 communicates with the inspection unit 123, the large-capacity stacker 124, and the post-processing apparatus 129 through the accessory I/Fs 274, 281, 289, and 290.

Figure 3A:
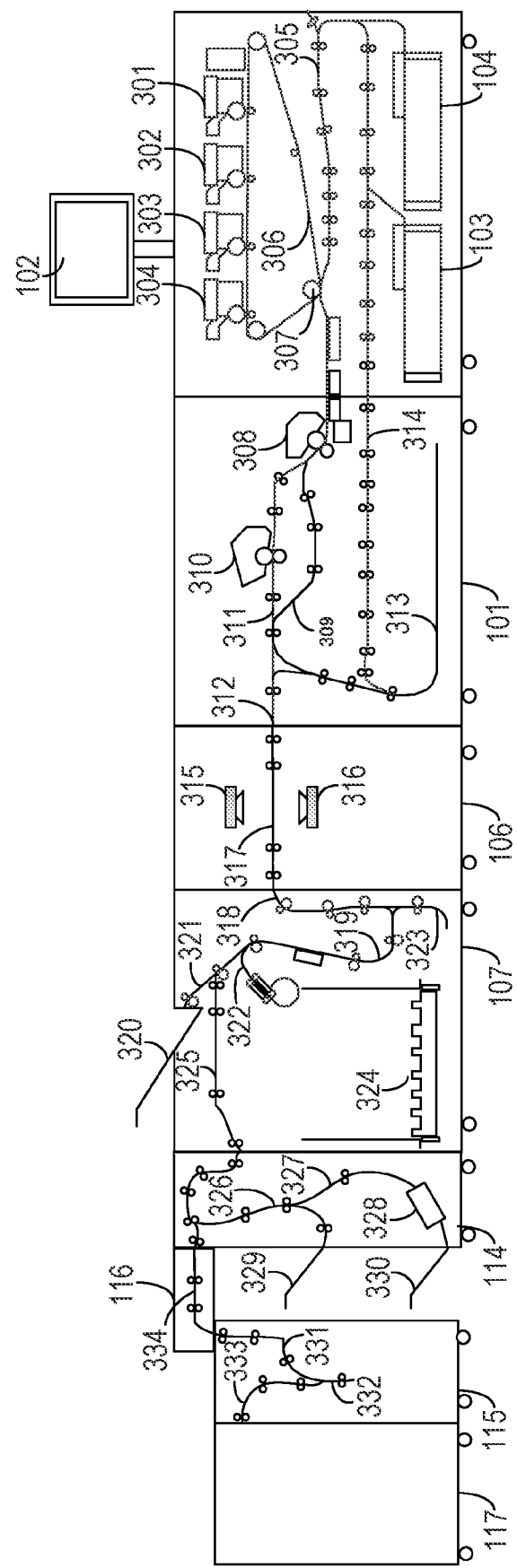
FIG. 3A illustrates the internal configuration of the printing apparatus, an inspection unit, a high-capacity stacker, a stapling apparatus, a relay apparatus, and a relay sub-apparatus.

FIG. 3A illustrates the internal configuration of the printing apparatus 101, the inspection unit 106, the large-capacity stacker 107, the stapling apparatus 114, the relay apparatus 115, and the relay sub-apparatus 116. The printing apparatus 101 receives user input via the UI panel 102 and displays the status of the apparatus and printing. Various kinds of sheet can be stored in the sheet feed decks 103 and 104. In each sheet feed deck, only the uppermost sheet of the stored sheet can be separated and conveyed to the sheet conveying path 305. Developing stations 301 to 304 form a toner image by using color toner of Y, M, C and K, respectively, to form a color image. The toner image formed here is primarily transferred to an intermediate transfer belt 306. The intermediate transfer belt 306 is rotated clockwise in the drawing, and the toner image is transferred to the sheet conveyed from the sheet conveying path 305 at a secondary transfer position 307. A fixing unit 308 is provided with a pressure roller and a heating roller, and when the sheet passes between the rollers, the toner is melted and pressed to fix the toner image on the sheet. The sheet coming out of the fixing unit 308 is conveyed to a discharge port 312 through a sheet conveyance path 309. If further melting/ crimping is required for fixing depending on the type of sheet, the sheet is conveyed to the second fixing unit 310 by using the upper sheet conveying path after passing through the fixing unit 308, and after performing additional melting/crimping, the sheet is conveyed to the discharge port 312 through a sheet conveying path 311. If an image forming mode is double-sided, the sheet is conveyed to a sheet reversing path of 313, reversed at the sheet reversing path 313, and then conveyed to a double-sided conveyance path 314, and image transfer on the second side is performed at the secondary transfer position 307. The sheet output from the discharge port 312 is input to the inspection unit 106.

CISs 315 and 316 are arranged in the inspection unit 106 so as to face each other. The CIS 315 is a sensor for scanning the front surface of the sheet, and the CIS 316 is a sensor for scanning the back surface of the sheet. The inspection unit 106 scans the sheet by using the CISs 315 and 316 at the timing when the sheet conveyed to the sheet conveying path 317 reaches a predetermined position. The scanned image is transmitted to the inspection apparatus 108 via the inspection apparatus I/F 215 and the inspection unit I/F 231. The CPU 226 of the inspection apparatus 108 determines whether or not the received image has a defect, and notifies the inspection unit 106 of the determined result via the inspection unit I/F 231 and the inspection apparatus I/F 215 again. The CPU 216 of the inspection unit 106 notifies the large-capacity stacker 107 of the received determination result via the accessory I/Fs 214 and 220.

The large-capacity stacker 107 can load large-capacity sheet. The large-capacity stacker 107 has a main tray 324 as a tray for loading sheet. The sheet passed through the inspection unit 106 enters the large-capacity stacker 107 from a sheet conveying path 318 through a sheet conveying path 319. The sheet is loaded on the main tray 324 from the paper transport path 319 via a paper transport path 322. The large-capacity stacker 107 has a top tray 320 as a sheet discharge tray. The CPU 221 of the large-capacity stacker 107 discharges the sheet whose defect is detected by the inspection apparatus 108 to the top tray 320. When outputting the sheet to the top tray 320, the sheet is conveyed from the sheet conveying path 319 to the top tray 320 via a sheet conveying path 321. A reversing unit 323 reverses the sheet. The reversing unit 323 is used for stacking sheets on the main tray 324. If the paper is stacked in the main tray 324 so that the direction of the incoming sheet and the direction of the sheet at the time of stacking are the same, the sheet is reversed once by the reversing unit 323. In the case of conveying the sheet to the top tray 320, the sheet is discharged without reversing during stacking, so that the reversing operation by the reversing unit 323 is not performed. When outputting the sheet to the post-processing apparatus 117, the sheet is conveyed from the sheet conveying path 319 to the stapling apparatus 114 via a sheet conveying path 325.

The stapling apparatus 114 is capable of stapling sheets and generating saddle-stitched brochures. The stapling apparatus 114 has a tray 1 (329) for loading sheet and a tray 2 (330) for discharging saddle-stitched brochures. The sheet passed through the large-capacity stacker 107 enters the stapling apparatus 114 through a sheet conveying path 326. The sheets are stapled and loaded in the tray 1 (329) via the sheet conveying path 326. In case of generating a saddle-stitched brochure, the stapling apparatus 114 conveys the sheets from the sheet conveying path 326 to a saddle-stitching unit 328 via a sheet conveying path 327. The CPU 250 of the stapling apparatus 114 discharges the generated pamphlets that are saddle-stitched by the discharge unit 252 and folded into the tray 2 (330). In case of outputting the sheet to the post-processing apparatus 117, the sheet is conveyed to the relay sub-apparatus 116 via the sheet conveyance path 326.

The relay apparatus 115 conveys the sheet discharged from the stapling apparatus 114 to the post-processing device 117. The relay apparatus 115 has the relay sub-apparatus 116 as a subordinate apparatus. The sheet passed through the stapling apparatus 114 enters the relay apparatus 115 from a sheet conveying path 334 of the relay sub-apparatus 116 via a sheet conveying path 331 of the relay apparatus 115. In order to convey the sheet entered the relay apparatus 115 to the post-processing device 117, the sheet is reversed once by a reversing unit 332 and discharged to the post-processing apparatus via a sheet conveyance path 333.

Figure 3B:
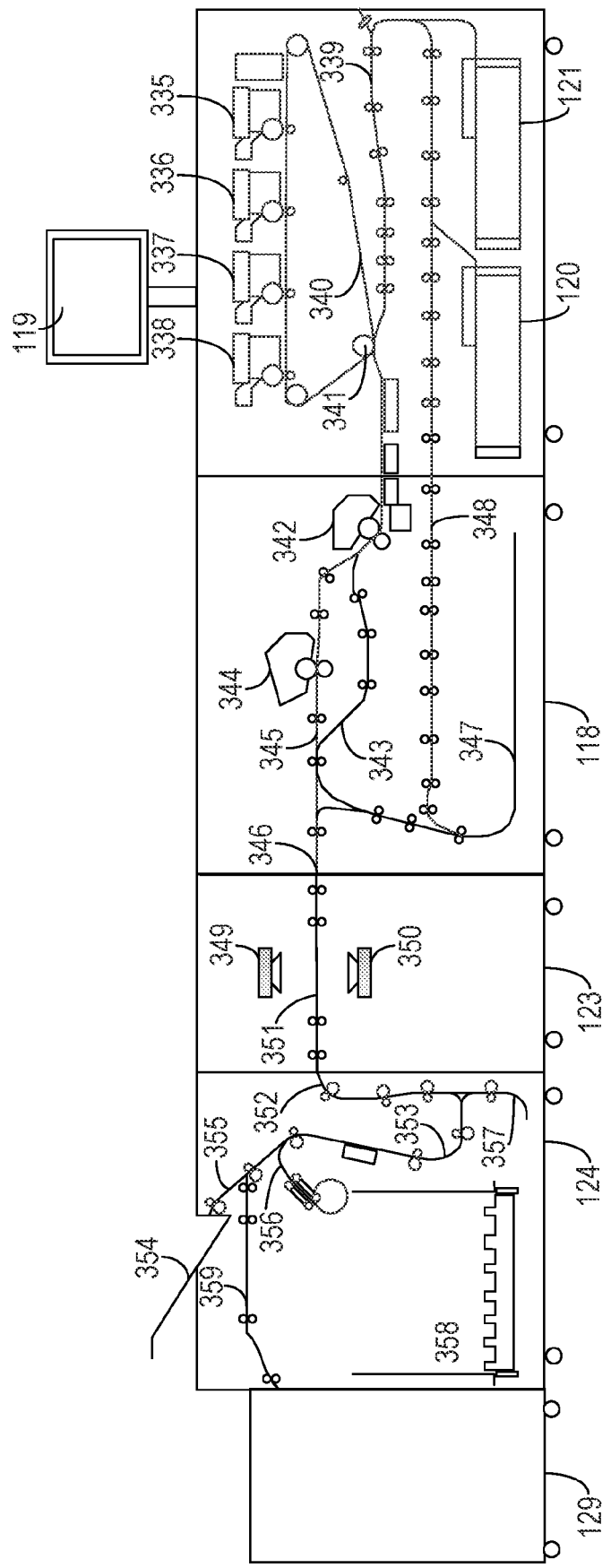
FIG. 3B illustrates the internal configuration of the printing apparatus, the inspection unit, the high-capacity stacker, the stapling apparatus, the relay apparatus, and the relay sub-apparatus.

FIG. 3B illustrates the internal configuration of the printing apparatus 118, the inspection unit 123, and the large-capacity stacker 124. Since components 335 to 348 constituting the printing apparatus 118 is the same as the components 301 to 314 of the printing apparatus 101, descriptions thereof will be omitted. Since components 349 to 351 constituting the inspection unit 123 are the same as the components 315 to 317 of the inspection unit 106, descriptions thereof will be omitted. Since components 352 to 359 constituting the large-capacity stacker 124 are the same as the components 318 to 325 of the large-capacity stacker 107, descriptions thereof will be omitted.

Figure 4:
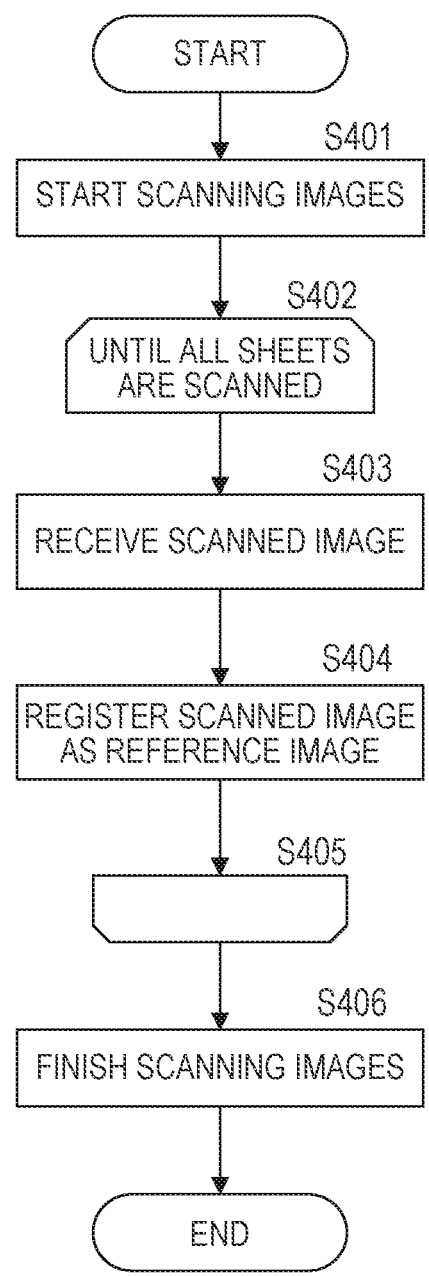
FIG. 4 illustrates a flowchart of an operation of the inspection apparatus in registering a reference image for inspection by a conventional method.

FIG. 4 is a flowchart describing the operations of the inspection apparatus 108 and the inspection apparatus 125 when the reference image for inspection is registered by the conventional method. Hereinafter, the description will be shown using the inspection apparatus 108. The processing of the flowchart is realized by the CPU 226 of the inspection apparatus 108 reading the program stored in the storage unit 228 into the RAM 227 and executing the program as necessary. The operation of the inspection apparatus 125 is the same as those of the inspection apparatus 108.

In step S401, the CPU 226 of the inspection apparatus 108 receives an image scanning start instruction from the user via a registration button (not shown) in the display unit 245. The processes of S403 to S404 are repeated until the image scanning of all the sheets is completed (S402 and S405).

In step S403, if the CPU 226 receives the images scanned by the CIS 315 and the CIS 316 from the inspection apparatus I/F 215 of the inspection unit 106 via the inspection unit I/F 231, the process proceeds to step S404. In step S404, the CPU 226 registers the image received in step S403 as a reference image in the RAM 227.

The above steps S403 to S404 are repeated until all the image scanning is completed, and if the image scanning of all the sheets is completed, the CPU 226 receives an instruction to complete the image scanning from the user at the display unit 245 (S406). Then, the processing of this flowchart is completed.

Note that the embodiment shown here is an example. The image scanning start instruction from the user via the display unit 245 may be automatically executed in conjunction with the print start instruction in the printing apparatus 101, the information processing apparatus 109, and the client computer 110, and the form thereof is not limited. Further, an image scanning end instruction from the user via the display unit 245 may be automatically executed in conjunction with the printing end in the printing apparatus 101, and the form thereof is not limited. For example, the inspection apparatus 108 may scan a plurality of images on the same page and register the result of the combination (that is, an image in which the plurality of images are laid out on one surface of the printing sheet) as a reference image.

The processing of the present embodiment will be described below with reference to FIGS. 5 to 11. The program of the printing apparatus relating to the following operations is stored in the storage unit 205 of the printing apparatus 101, read into the RAM 202, and executed by the CPU 201. The program of the inspection apparatus is stored in the storage unit 228 of the inspection apparatus 108, read into the RAM 227, and executed by the CPU 226. The program of the information processing apparatus is stored in the storage unit 236 of the information processing apparatus 109, read into the RAM 235, and executed by the CPU 234. The program of the client computer is stored in the storage unit 244 of the client computer 110, read into the RAM 242, and executed by the CPU 243.

Figure 5:
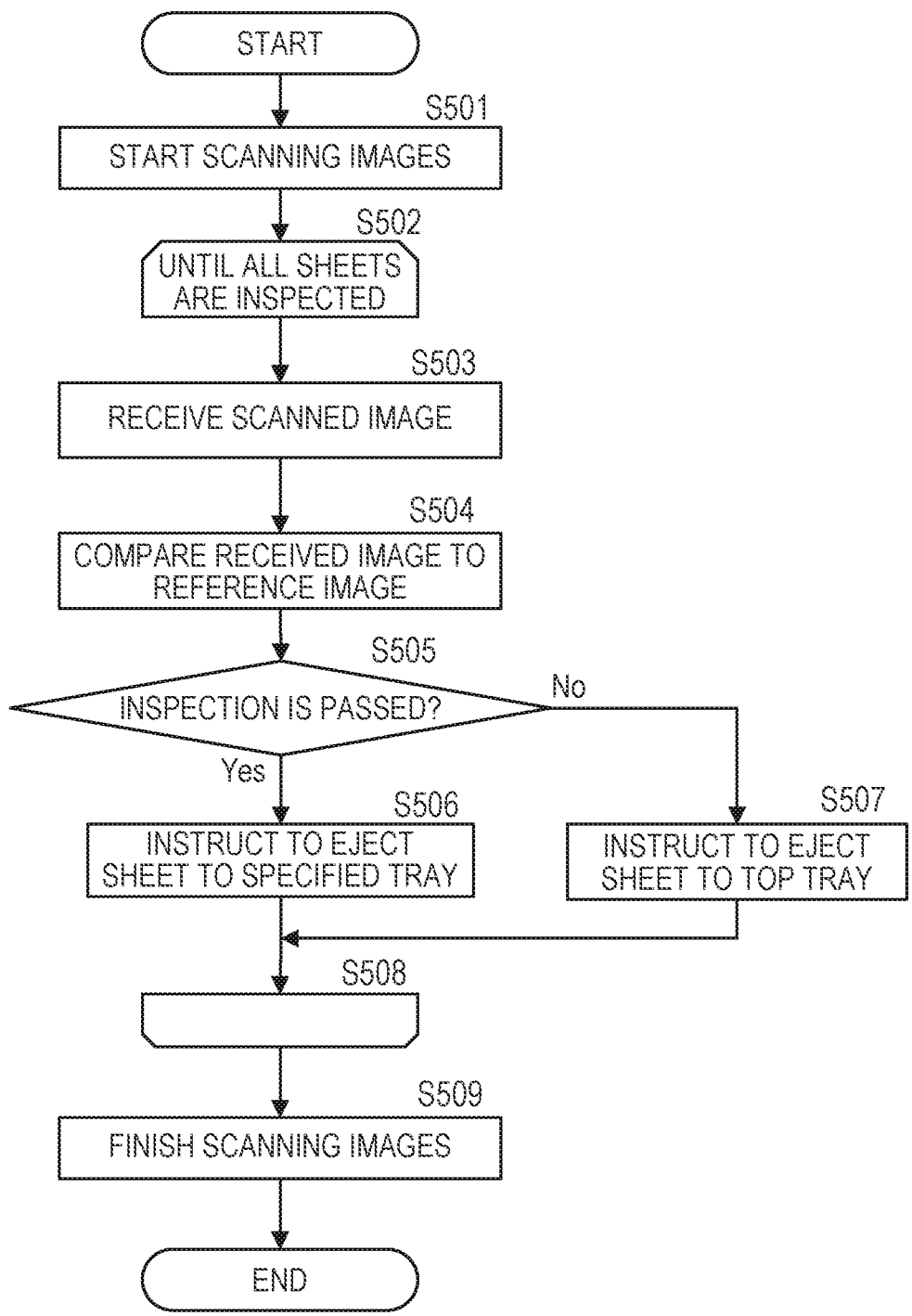
FIG. 5 illustrates a flowchart of a basic operation of the inspection apparatus in the inspection of the present embodiment.

FIG. 5 illustrates a flowchart of the basic operations of the inspection apparatus 108 and the inspection apparatus 125 in the inspection of the present embodiment. Hereinafter, the description will be shown using the inspection apparatus 108. The processing of the flowchart is realized by the CPU 226 of the inspection apparatus 108 reading the program stored in the storage unit 228 into the RAM 227 and executing the program as necessary. The operation of the inspection apparatus 125 is the same as those of the inspection apparatus 108.

In step S501, the CPU 226 of the inspection apparatus 108 receives an image scanning start instruction from the user via an inspection button (not shown) of the display unit 245. The processes of S503 to S507 are repeated until the inspection of all sheets to be inspected is completed (S502 and S508).

In step S503, if the CPU 226 receives the images scanned by the CIS 315 and the CIS 316 from the inspection apparatus I/F 215 of the inspection unit 106 via the inspection unit I/F 231, the process proceeds to step S504.

In step S504, the CPU 226 compares the reference image stored in the RAM 227 with the scan image to be inspected received in step S503. It is assumed that the reference image is stored in the RAM 227 after a sheet previously printed by the printing apparatus 101 is scanned by the CIS 315 and 316 and transmitted from the inspection apparatus I/F 215 to the inspection unit I/F 231 or imported. In this comparison operation, a characteristic point of the image is first used as a reference point for alignment to align the image of the reference image with the scan image to be inspected. Next, in the scan image to be inspected, the four corners of the paper and the alignment reference point of the scan image are analyzed to detect whether there is a positional deviation of the image with respect to the sheet. Next, the density values of the reference image and the scan image to be inspected are compared for each pixel. If no defect is detected as a result of the above comparison, the inspection criterion is deemed to be satisfied. On the other hand, if a defect is detected, it is considered that the inspection criterion is not satisfied. In the RAM 227, a storage destination of the reference image to be compared with the image scanned by the CIS 315 and a storage destination of the reference image to be compared with the image scanned by the CIS 316 are separately allocated. At the time of comparison, the inspection apparatus 108 reads out the reference image by referring to a storage location predetermined in accordance with the CIS to be compared.

In step S505, the CPU 226 determines the inspection result. If the inspection criterion is satisfied (Yes in S505, that is, the inspection is passed), the CPU 226 advances the process to step S506. In step S506, the CPU 226 notifies the inspection apparatus I/F 215 of the inspection unit 106 via the inspection unit I/F 231 that the inspection criterion is satisfied, that is, instructs the tray designated by the print job to discharge the sheet.

On the other hand, if the inspection criterion is not satisfied (No in S505, that is, the inspection is failed), the CPU 226 advances the process to step S507. In step S507, the CPU 226 notifies the inspection apparatus I/F 215 of the inspection unit 106 via the inspection unit I/F 231 that the inspection criterion is not satisfied, that is, instructs the large-capacity stacker 107 to discharge the sheet to the top tray 320.

The processes of S503 to S507 are repeated until the inspection of all sheets is completed, and when the inspection of all sheets to be inspected is completed, the CPU 226 receives an instruction of the end of image reading from the user via the display unit 245 (S509). Then, the processing of this flowchart is completed.

Note that the embodiment shown here is an example. The image scanning start instruction from the user via the display unit 245 may be automatically executed in conjunction with the print start instruction in the printing apparatus 101, the information processing apparatus 109, and the client computer 110, and the form thereof is not limited. Further, the image reading end instruction from the user via the display unit 245 may be automatically executed in conjunction with the printing end in the printing apparatus 101, and the form thereof is not limited.

Figure 6:
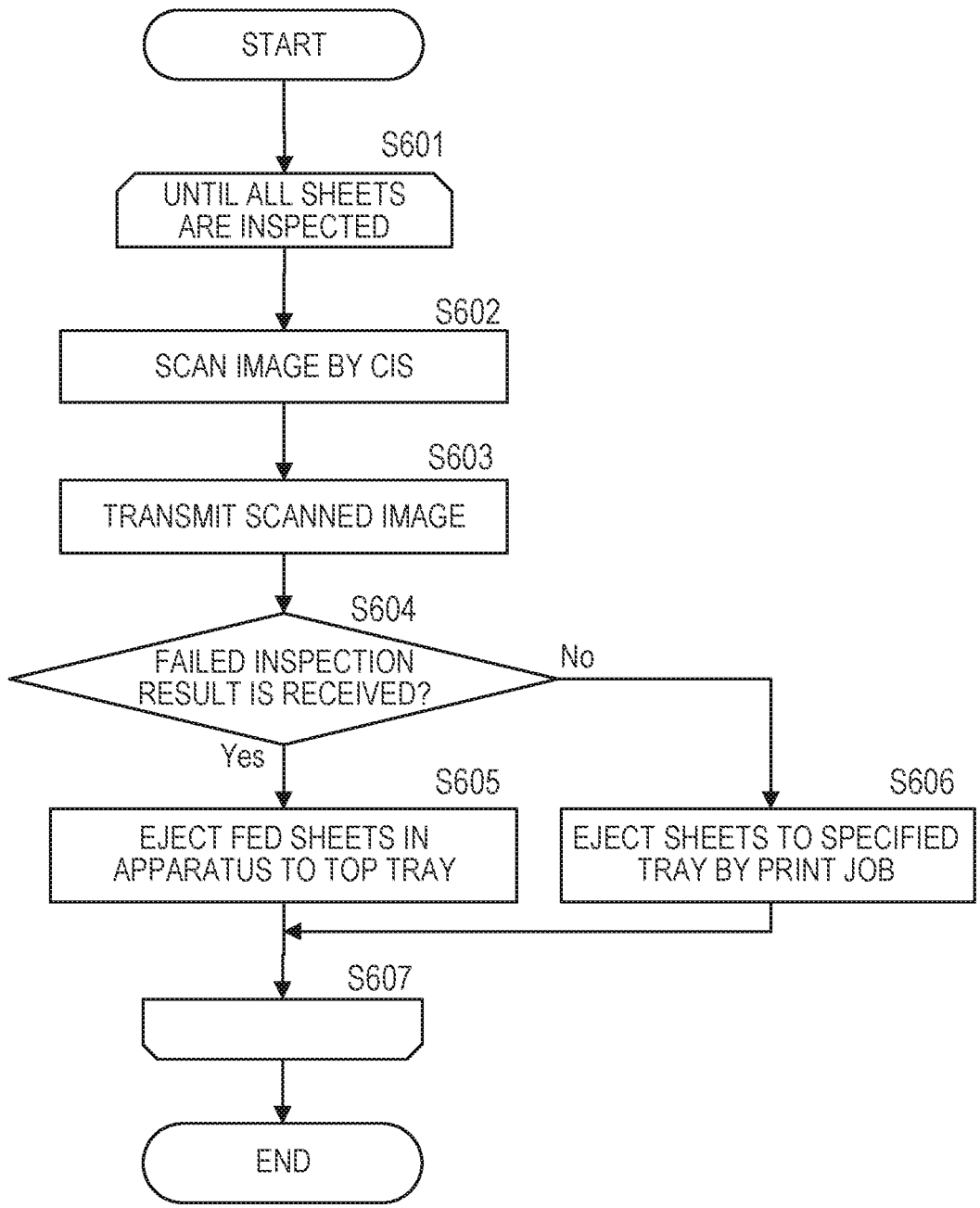
FIG. 6 illustrates a flowchart of an operation of the inspection unit during the inspection in the present embodiment.

FIG. 6 is a flowchart showing an example of the operations of the inspection unit 106 and the inspection unit 123 during the inspection in the present embodiment. Hereinafter, descriptions will be shown using the inspection unit 106. The processing of the flowchart is realized by the CPU 216 of the inspection unit 106 reading the program stored in the storage unit 247 into the RAM 217 and executing the program as necessary. The operations of the inspection unit 123 are the same as those of the inspection unit 106.

If the CPU 201 of the printer 101 receives the print job and starts printing, the process shown in the flowchart of FIG. 6 starts. The processes of S602 to S606 are repeated until all sheets to be printed by the printer 101 based on the print job are completed (S601 and S607).

In step S602, the CPU 216 of the inspection unit 106 uses the CIS 315 and the CIS 316 to scan the image printed on the conveyed sheet. In step S603, the CPU 216 transmits the image scanned in step S602 to the inspection unit I/F 231 of the inspection apparatus 108 via the inspection apparatus I/F 215.

Next, in step S604, if the CPU 216 receives from the inspection unit I/F 231 of the inspection apparatus 108 via the inspection apparatus I/F 215 a notification indicating that the inspection criterion is not satisfied as an inspection result for the image transmitted in step S603 (Yes in step S604), the CPU 216 advances the process to step S605. In step S605, the CPU 216 instructs the printing apparatus 101 and the large-capacity stacker 107 via the accessory I/F 214 to eject to the top tray 320 all sheets that have already been fed from the sheet feeding decks 103 to 104 and are on the sheet conveying path after the inspection result in which the inspection criterion is not satisfied.

On the other hand, if the CPU receives a notification that the inspection criterion is satisfied (No in S604), the CPU 216 advances the process to step S606. In step S606, the CPU 216 instructs the large-capacity stacker 107 via the accessory I/F 214 to output the sheet to the sheet output destination specified in the print job.

The processes in S602 to S606 are repeated until the inspection of all sheets is completed. When the print job is completed and the inspection of all sheets to be printed by the printing apparatus 101 based on the print job is completed, the processing of this flowchart is completed.

Hereinafter, the processes of printing a print job to be discharged to the post-processing apparatus 117 by the printing apparatus 101, registering the reference image in the inspection apparatus 108, and importing the reference image registered in the inspection apparatus 108 into the inspection apparatus 125 will be specifically described. It is considered that the post-processing apparatus 117 is the same apparatus as the post-processing apparatus 129.

Figure 10B:
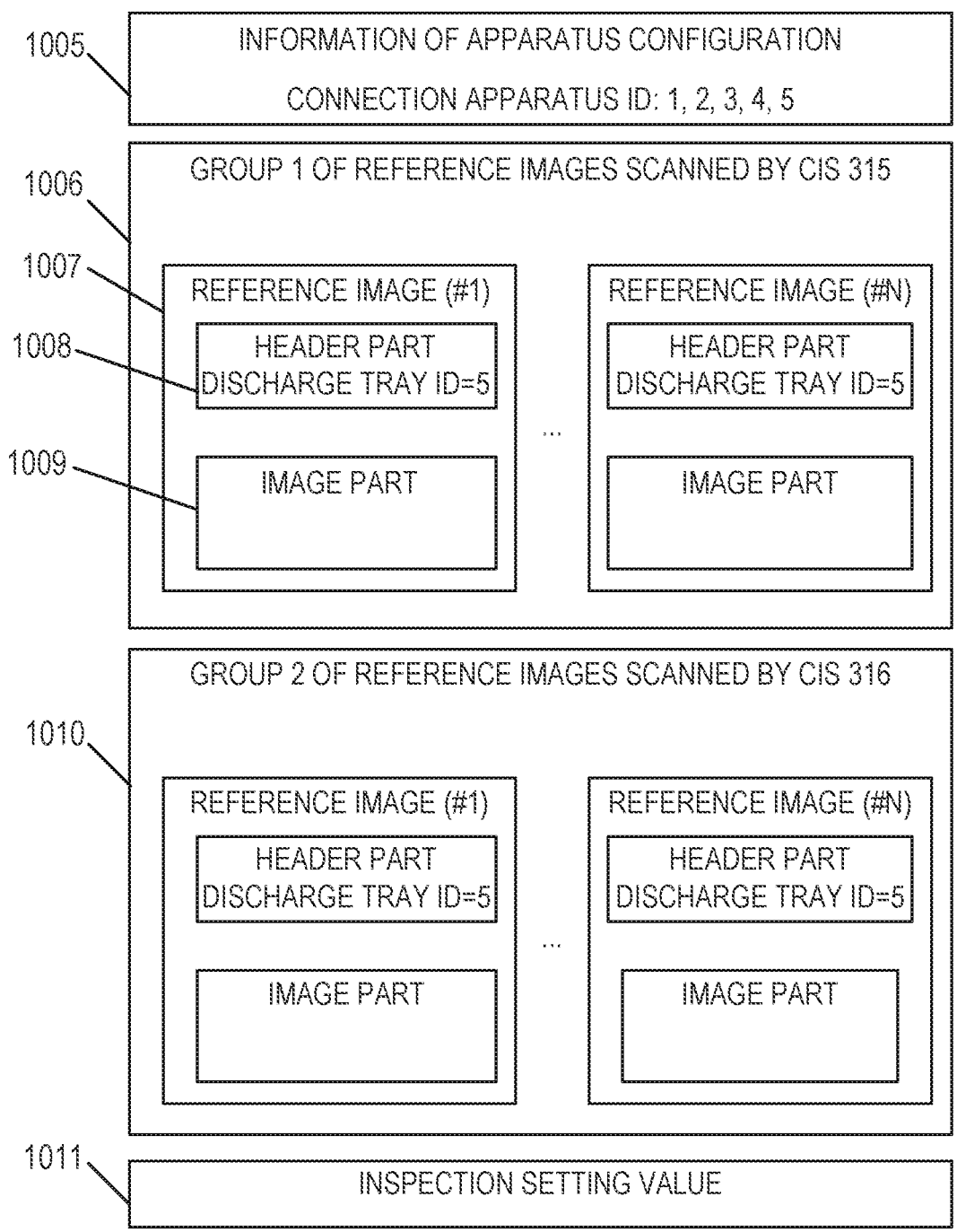
FIG. 10B illustrates information of apparatus configuration and reference information in the present embodiment.

FIG. 10A and FIG. 10B are diagrams describing the device configuration information and the reference information in the present embodiment. Hereinafter, FIG. 10A and FIG. 10B will be collectively referred to as "FIG. 10". In the present embodiment, reference information 1004 including the reference image as shown in FIG. 10 is registered in the inspection apparatus 108, and the reference image is imported into the inspection apparatus 125. In the print job for registering the reference image in the inspection apparatus 108, it is assumed that the number "5" is set in the discharge tray ID for discharging sheets to the post-processing apparatus 117.

First, the reference information 1004 registered in the inspection apparatus 108 will be described. The reference information 1004 includes information of apparatus configuration 1005, a reference image group 1 (1006) scanned by the CIS 315, a reference image group 2 (1010) scanned by the CIS 316, and an inspection setting value 1011.

The information of apparatus configuration 1005 includes an apparatus ID (1001) of an apparatus connected to the printer 101 that has executed a print job for registering the reference image. The apparatus ID (1001) is defined in the apparatus ID definition 1000 as an ID common to the printing apparatus 101, the inspection apparatus 108, the printing apparatus 118, and the inspection apparatus 125.

The reference image group 1 (1006) scanned by the CIS 315 means a set of all sheets of the reference image scanned by the CIS 315. Each reference image 1007 includes, for example, a header section 1008 and an image section 1009. Job information is embedded in the header section 1008 as additional information for inspection. The job information includes a discharge tray ID (1003) of a discharge tray set by the print job in which the reference image is registered. The discharge tray ID (1003) is defined in the discharge tray ID definition 1002 as an ID common to the printing apparatus 101, the inspection apparatus 108, the printing apparatus 118, and the inspection apparatus 125.

The reference image group 2 (1010) scanned by the CIS 316 means a set of all sheets of the reference image scanned by the CIS 316. The inspection set value 1011 means a setting value related to the inspection in the inspection apparatus 108, such as an inspection region and inspection accuracy.

Figure 7:
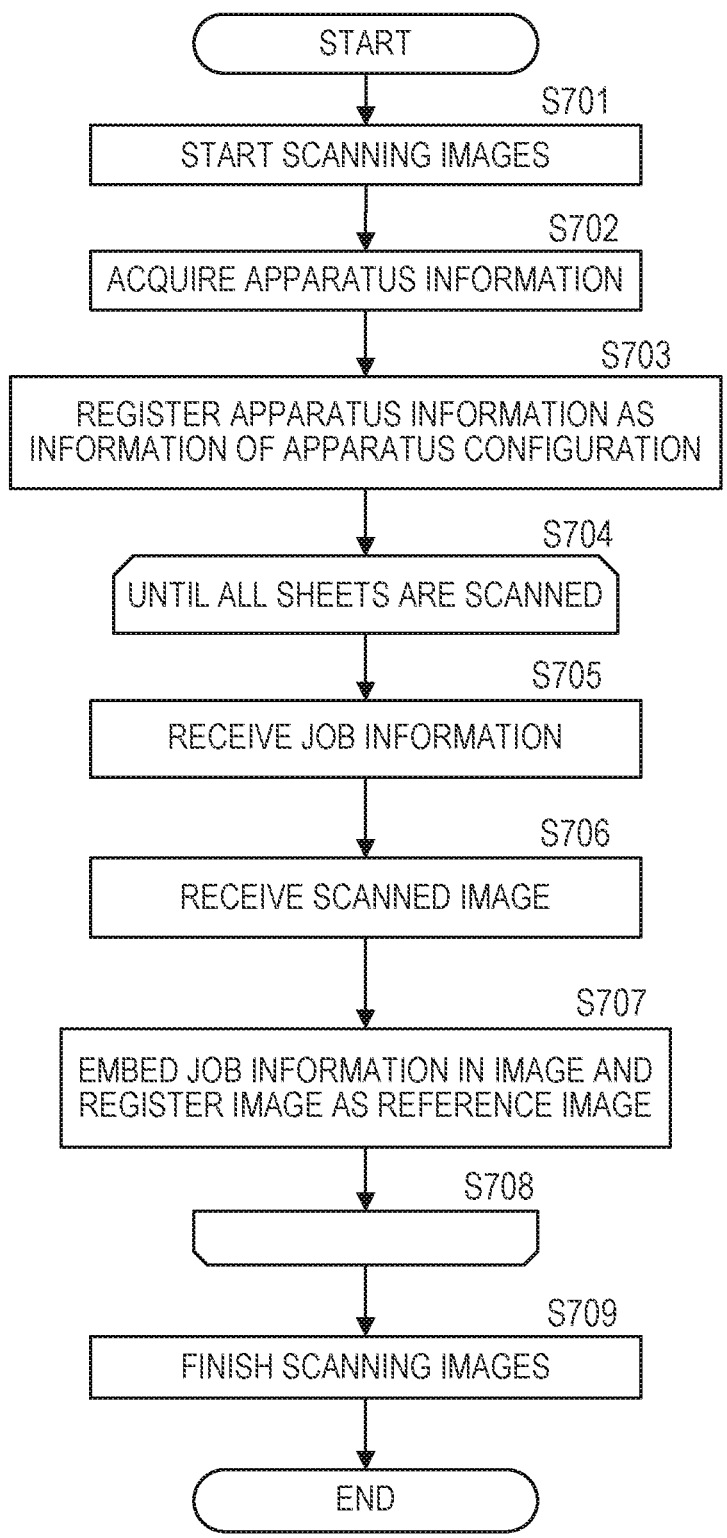
FIG. 7 illustrates a flowchart of an operation of the inspection apparatus when registering the reference image for inspection in the present embodiment.

FIG. 7 is a flowchart describing the operation (first registration processing) of the inspection apparatus 108 when registering the reference image for inspection in the present embodiment. The processing of the flowchart is realized by the CPU 226 of the inspection apparatus 108 reading the program stored in the storage unit 228 into the RAM 227 and executing the program as necessary.

In step S701, the CPU 226 of the inspection apparatus 108 receives the image scanning start instruction from the user via the registration button (not shown) in the display unit 245. Then, the process proceeds to step S702 and the CPU 226 requests the inspection unit 106 to acquire the apparatus ID (1001) of the apparatus connected to the printing apparatus 101. Here, it is assumed that the device IDs 1, 2, 3, 4, and 5 can be acquired as shown in the information of apparatus configuration 1005 of FIG. 10. In step S703, the CPU 226 registers the device ID (1001) acquired in step S702 in the RAM 227 as the information of apparatus configuration 1005.

The processes shown in S705 to S707 are repeated until the image scanning of all the sheets is completed (S704 and S708). In step S705, the CPU 226 receives the job information including the discharge tray ID (1003) of the image scanned by the CIS 315 and the CIS 316 from the inspection apparatus I/F 215 of the inspection unit 106 via the inspection unit I/F 231. Next, in step S706, the CPU 226 receives the image scanned by the CIS 315 and the CIS 316 from the inspection apparatus I/F 215 of the inspection unit 106 via the inspection unit I/F 231.

In step S707, the CPU 226 registers the job information received in step S705 and the image received in step S706, into the RAM 227 as a reference image. For example, as in the reference image 1007 shown in FIG. 10, a reference image composed of the header section 1008 and the image section 1009, in which the job information received in step S705 is embedded in the header section 1008, and in which the image received in step S706 is embedded in the image section 1009 is registered in the RAM 227.

The processes in S705 to S707 are repeated until all image reading is completed, and when image scanning of all sheets is completed, the CPU 226 receives an instruction to complete image scanning from the user in the display unit 245 (S709). Then, the process of this flowchart ends.

Figure 8:
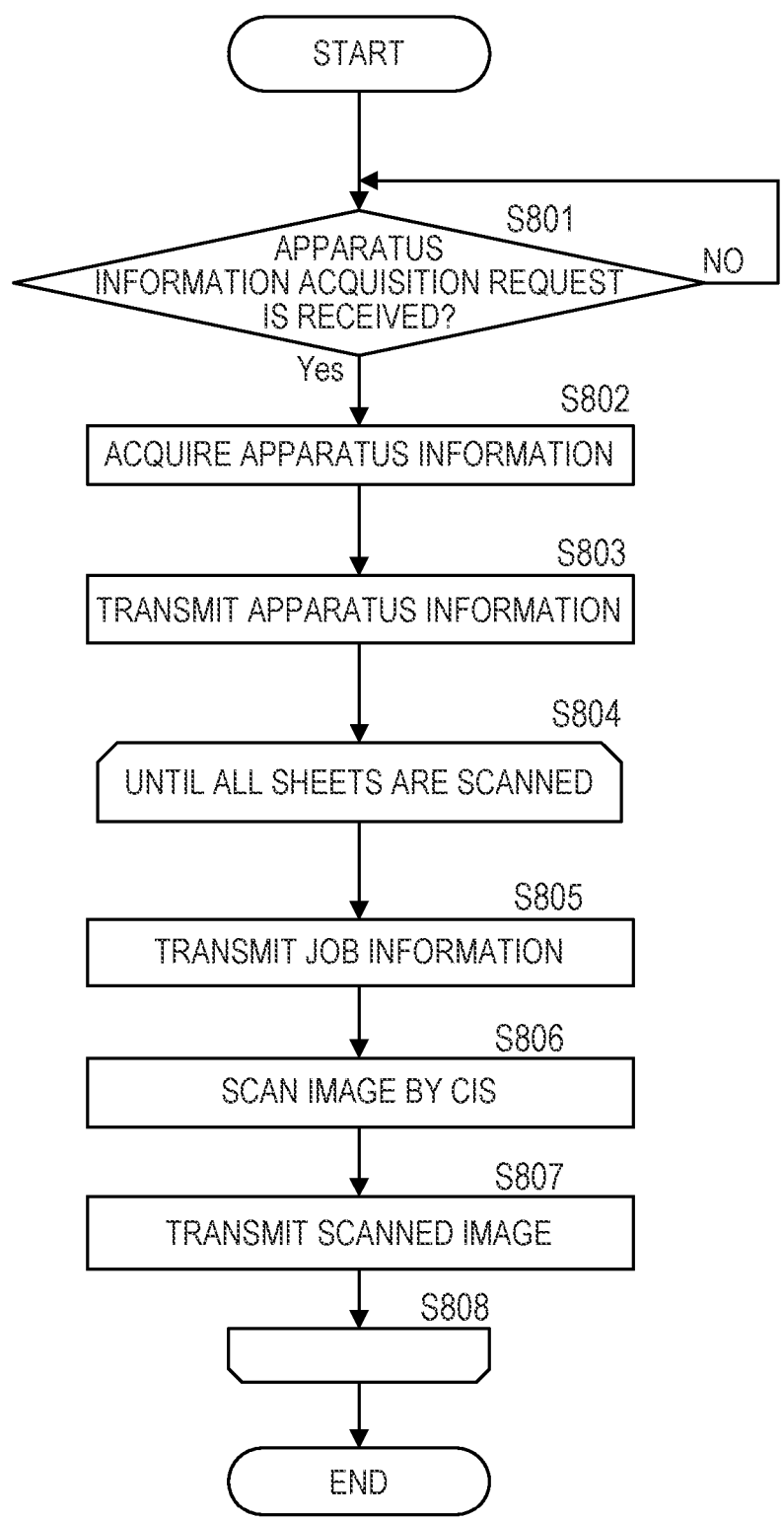
FIG. 8 illustrates a flowchart of the operation of the inspection unit when registering a reference image for inspection in the present embodiment.

FIG. 8 is a flowchart describing the operation of the inspection unit 106 when registering the reference image for inspection in the present embodiment. The processing of the flowchart is realized by the CPU 216 of the inspection unit 106 reading the program stored in the storage unit 247 into the RAM 217 and executing the program as necessary.

If the CPU 201 of the printing apparatus 101 receives the print job and starts printing, the process of the flowchart of FIG. 8 starts. If the CPU 216 of the inspection unit 106 receives an apparatus information acquisition request from the inspection apparatus 108 in step S801, the CPU advances the process to step S802.

In step S802, the CPU 216 issues a connection apparatus acquisition request to the printer 101 via the accessory I/F 214, and acquires the apparatus ID (1001) of the apparatus connected to the printing apparatus 101. Here, it is assumed that the apparatus IDs 1, 2, 3, 4, and 5 can be acquired as shown in the information of apparatus configuration 1005 of FIG. 10. In step S803, the CPU 216 transmits the apparatus ID (1001) acquired in step S803 to the inspection unit I/F 231 of the inspection apparatus 108 via the inspection apparatus I/F 215.

The processes of S805 to S807 are repeated until the scanning of the images of all the sheets to be printed by the printing apparatus 101 based on the print job is completed (S804 and S808).

In step S805, the CPU 216 transmits the discharge tray ID (1003) received when the sheet is conveyed from the printing apparatus 101 to the inspection unit I/F 231 of the inspection apparatus 108. Here, for an example of discharging sheets to the post-processing apparatus 117, the number "5" is transmitted as the discharge tray ID as shown in the reference image group 1 (1006) and the reference image group 2 (1010) of FIG. 10.

Next, in step S806, the CPU 216 uses the CIS 315 and the CIS 316 to scan the image printed on the conveyed sheet. In step S807, the CPU 216 transmits the image scanned in step S806 to the inspection unit I/F 231 of the inspection apparatus 108 via the inspection apparatus I/F 215.

The processes of S805 to S807 are repeated until all the sheets are scanned, and if the print job is finished and all the sheets to be printed by the printing apparatus 101 based on the print job are scanned, the process of this flowchart ends.

FIG. 9 is a timing chart between the printing apparatus 101, the inspection apparatus 108, and the inspection unit 106 if the reference image for inspection is registered in the present embodiment. In step S901, the inspection apparatus 108 requests the inspection unit 106 to acquire apparatus information as described in step S702 of FIG. 7. In step S902, if the inspection unit 106 receives the apparatus information acquisition request in step S801 of FIG. 8, the inspection unit 106 issues a connection apparatus acquisition request to the printing apparatus 101 as described in step S802 of FIG. 8. The printing apparatus 101 acquires an apparatus ID (1001) of the apparatus connected via the cable 225.

In step S903, the printing apparatus 101 transmits an ID list of the connected apparatuses to the inspection unit 106. In step S904, the inspection unit 106 transmits the acquired apparatus ID to the inspection apparatus 108 as described in step S803 of FIG. 8. In step S905, as described in step S703 in FIG. 7, the inspection apparatus 108 registers the received apparatus ID as information of the apparatus configuration 1005.

In step S906, the printing apparatus 101 transmits conveyance information (including at least the discharge tray ID (1003)) of the sheet to be scanned by the inspection unit 106 to the inspection unit 106. In step S907, the inspection unit 106 transmits the received transport information as job information to the inspection apparatus 108 as described in step S805 of FIG. 8. In step S908, the inspection unit 106 transmits the scanned image to the inspection apparatus 108 as described in step S807 of FIG. 8. At step S909, the inspection apparatus 108 registers the received job information and image information as the reference image as described in steps S705 to S707 of FIG. 7. The above is a series of steps for registering a reference image for inspection in the present embodiment.

Next, a series of processes for importing the reference information registered in the inspection apparatus 108 into the inspection apparatus 125 will be described. FIG. 11 illustrates a flowchart of an example of the operation (second registration process) of the inspection apparatus 125 if the inspection reference information registered by the inspection apparatus 108 in the present embodiment is imported into the inspection apparatus 125. The processing of the flowchart is realized by the CPU 291 of the inspection device 125 reading the program stored in the storage unit 293 into the RAM 292 and executing the program as necessary.

Before the processing of FIG. 11, when the export operation is received by the display unit 297 of the inspection apparatus 108, the CPU 226 outputs the reference information 1004, which is a set of reference images including the information of the apparatus configuration and the job information registered in the RAM 227, to the storage unit 228 as a file. The file of the output reference information 1004 is carried to the inspection apparatus 125 by any means. For example, the reference information 1004 is stored in a USB memory via a USB I/F (not shown) of the inspection apparatus 108, and the USB memory is connected to a USB I/F (not shown) of the inspection apparatus 125 so that the reference information 1004 can be read. If the import operation is received by the display unit 297 of the inspection apparatus 125, the CPU 291 of the inspection apparatus 125 reads the reference information 1004 and starts the processing of the operation flowchart of FIG. 11.

At step S1101, the CPU 291 of the inspection apparatus 125 analyzes the reference image 1007 of the reference image group 1 (1006) among the imported reference information 1004. The CPU 291 analyzes information of the header section 1008 and acquires the discharge tray ID 1003. Here, the number "5" of the discharge tray ID can be acquired.

Next, in step S1102, if the discharge tray ID acquired in step S1101 is "5" indicating the post-processing apparatus (Yes in step S1102), the CPU 291 advances the processing to step S1103. On the other hand, if the discharge tray ID is other than "5" indicating the post-processing apparatus (No in step S1102), the process proceeds to step S1119. The processing after step S1119 will be described later. If the analysis of the header section of the reference image fails, the CPU 291 may notify the display unit 297 to confirm whether or not the reference image can be imported, since the subsequent processing cannot be executed normally. Examples of failure in the analysis include the case where corruption of the import information or the reference information is imported from an inspection apparatus not according to the present embodiment.

In step S1103, the CPU 291 acquires the information of the apparatus configuration 1005 among the imported reference information 1004. Here, the numbers 1, 2, 3, 4, and 5 of the apparatus ID 1001 are acquired as the information of the apparatus configuration.

In step S1104, the CPU 291 initializes a flag A indicating whether the printing apparatus 101 as the import source includes an apparatus having a function of changing the printing surface depending on discharge trays and apparatus configurations. Here, as an initial value, the apparatus having the function of changing the printing surface is not present (false). In addition, the CPU 291 initializes a flag B indicating whether the printing apparatus 118 as the import destination includes an apparatus having a function of changing the printing surface depending on discharge trays and apparatus configurations. Here, as an initial value, the apparatus having the function of changing the printing surface is not present (false). Hereinafter, descriptions will be made in a form of hard coding, with assuming the relay apparatus 115 as an apparatus that has the function of changing the printing surface depending on discharge trays and apparatus configurations.

Next, in steps S1105 to S1108, the CPU 291 performs the processing of steps S1106 to S1107 for each apparatus ID included in the information of the apparatus configuration acquired in step S1103.

At step S1106, the CPU 291 determines whether the apparatus ID being processed is a relay apparatus (the apparatus ID is "4"). If the apparatus ID being processed is a relay apparatus (Yes in step S1106), the CPU 291 advances the process to step S1107. In step S1107, the CPU 291 sets the flag A to "relay apparatus present" ("true"), and advances the process for the next apparatus ID. On the other hand, if the apparatus ID being processed is not a relay apparatus (No in step S1106), the CPU 291 performs nothing for that apparatus ID being processed, and advances the process for the next apparatus ID.

If the process is completed for all the apparatus IDs included in the information of the apparatus configuration acquired in step S1103, the CPU 291 advances the process to step S1109.

In step S1109, the CPU 291 acquires the apparatus ID of the apparatus connected to the printing apparatus 118 via the inspection unit 123 as the information of the apparatus configuration of the import destination by using the same method as in step S702 of FIG. 7. Next, in steps S1110 to S1113, the CPU 291 performs the processing of steps S1106 to S1107 for each apparatus ID included in the information of the apparatus configuration of the import destination acquired in step S1109.

At step S1111, the CPU 291 determines whether the apparatus ID being processed is a relay apparatus (the apparatus ID is "4"). If the apparatus ID being processed is the relay device (Yes in step S1111), the CPU 291 advances the process to step S1112. In step S1112, the CPU 291 sets the flag B to "relay apparatus present" ("true"), and advances the process for the next apparatus ID. On the other hand, if the apparatus ID being processed is not a relay apparatus (No in step S1111), the CPU 291 performs nothing for that apparatus ID being processed, and advances the process for the next apparatus ID.

If the process is completed for all the apparatus IDs included in the information of the apparatus configuration of the import destination acquired in step S1109, the CPU 291 advances the process to step S1114. In step S1114, the CPU 291 determines whether or not the current reference information can be imported by the import-source inspection apparatus 108 and the import-destination inspection apparatus 125. For example, the flag A and the flag B are compared to determine whether only one of the inspection apparatuses includes the relay apparatus. If the flag A is equal to the flag B (Yes in step S1114), the CPU 291 determines that the present reference information can be imported and inspected by the inspection apparatus 125, and advances the process to step S1115. On the other hand, if the flag A is different from the flag B (No in step S1114), the CPU 291 determines that a defect would be detected by the inspection apparatus 125 if the current reference information is imported, and advances the process to step S1117.

In step S1115, the CPU 291 imports the reference image group 1 of the imported reference information 1004 into the reference image storage destination (the storage destination of the reference image group 1) where the reference image group 1 is compared with the image scanned by the CIS 349 in the RAM 292. Next, in step S1116, the CPU 291 imports the reference image group 2 of the imported reference information 1004 into the reference image storage destination (the storage destination of the reference image group 2) where the reference image group 2 is compared with the image scanned by the CIS 350 in the RAM 292. Then, the processing of this flowchart is completed.

In step S1117, the CPU 291 imports the reference image group 1 of the imported reference information into the reference image storage destination (storage destination of the reference image group 2) to be compared with the image scanned by the CIS 350 in the RAM 292 because the reference image to be compared with the import source is different. Next, in step S1118, the CPU 291 imports the reference image group 2 of the imported reference information into the reference image storage destination (the storage destination of the reference image group 1) to be compared with the image scanned by the CIS 349 in the RAM 292 because the reference image to be compared with the import source is different. Then, the processing of this flowchart is completed. In addition, S1119 and S1120 are the same processes as those in S1115 and S1116, and their descriptions are omitted.

As described above, there is a case where the discharge destination specified by the job information registered with the reference image at the import source is a predetermined discharge destination (the post-processing apparatus in the present embodiment). In addition, there is another case where the information of the apparatus configuration of the import source indicates configurations different from the information of the apparatus configuration of the import destination with respect to the presence or absence of a sheet inversion mechanism (the relay apparatus in the present embodiment) that can be provided on the conveyance path to the predetermined discharge destination. In these cases, the front and back sides of the import source reference image are replaced and registered as the import destination reference image. Thus, when the reference image is imported, the reference image can be automatically adjusted according to the apparatus configuration of the import destination, and the inspection can be performed without re-registering the reference image again by the user. As a result, even if the same product is printed by another printing apparatus and inspected by an inspection apparatus connected to the printing apparatus, the user can save the trouble of re-registering the reference image, and the usability can be improved.

Conventionally, if the printing surface is changed due to the difference in the apparatus configuration of the printing apparatus, it is necessary for the user to re-register the reference image, which is time-consuming. Therefore, according to the present embodiment, the information of the apparatus configuration and the job information are acquired and registered in the reference image at the time of registration of the reference image, and the difference in the printing surface is detected from this information at the import destination, and the front and back of the reference image are replaced, so that the inspection can be performed without re-registering the reference image.

As described above, according to the present embodiment, the same printing surface can be compared between the reference image registered in the state where the relay apparatus 115 is connected with the printing apparatus 101 and the image inspected in the state where the relay apparatus is not connected with the printing apparatus 118. That is, since the storage destination of the reference image is adjusted so as to automatically replace the front and back sides of the reference image according to the apparatus configuration of the import destination at the time of import, the user can perform inspection without re-registering the reference image. Therefore, if the same product is printed by another printing apparatus and inspected by a connected inspection apparatus, it is possible to solve the problem that it takes time to re-register the reference image.

It should be noted that the inspection apparatus 108 and the inspection apparatus 125 have the same configuration, and the roles of the inspection apparatus 108 and the inspection apparatus 125 can be exchanged to perform the processing of the present embodiment. That is, it is also possible to import the reference image registered in the inspection apparatus 125 by the method shown in FIG. 7 into the inspection apparatus 108 by the method shown in FIG. 11.

The configuration and contents of the various data described above are not limited thereto. The various configurations and contents are configured according to the use and purpose. Although one embodiment has been described above, the present invention may be implemented, for example, as a system, apparatus, method, program, or storage medium. Specifically, the present invention may be applied to a system comprising a plurality of apparatuses, or may be applied to an apparatus comprising one apparatus. Further, all the configurations in which the above embodiments are combined are also included in the present invention.

According to the present invention, when the reference image is imported, the reference image can be automatically adjusted according to the apparatus configuration of the import destination, and the inspection can be performed without registering the reference image again by the user. As a result, even if the same product is printed by another printing apparatus and inspected by an inspection apparatus connected to the printing apparatus, the user can save the trouble of re-registering the reference image, and the usability can be improved.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-136389, filed Aug. 24, 2021, which is hereby incorporated by reference herein in its entirety.

What is claimed is:

1. An inspection system comprising:
a first inspection apparatus comprising:
a memory; and
at least one first processor in communication with the memory, wherein the at least one first processor is configured to perform inspecting print quality of a first print product based on a comparison between a first image scanned from the first print product printed by a first printing apparatus and a first reference image; and
a second inspection apparatus comprising:
a memory; and
at least one second processor in communication with the memory, wherein the at least one second processor is configured to perform inspecting print quality of a second print product based on a comparison between a second image scanned from the second print product printed by a second printing apparatus and a second reference image,
wherein the at least one first processor is configured to perform first registering information of a print job related to printing of the first image with the first image and first configuration information indicating configuration of the first printing apparatus when the first image scanned from the first print product printed by the first printing apparatus is registered as the first reference image,
wherein the at least one second processor is configured to perform second registering the second reference image by importing the first reference image registered in the first inspection apparatus, and
wherein the at least one second processor is configured to perform controlling whether the first reference image is registered as the second reference image by reversing a front and back of the first reference image or registered as the second reference image without reversing the front and back of the first reference image based on the information of the print job with the first image and second configuration information indicating configuration of the second printing apparatus.

2. The inspection system according to claim 1, wherein the at least one second processor performs registering the first reference image as the second reference image by reversing the front and back of the first reference image in a case where a discharge destination indicated by the information of the print job is a predetermined sheet discharge destination and the first configuration information and the second configuration information are different configurations with respect to a presence or absence of a sheet reversing unit provided on a conveyance path to the predetermined sheet discharge destination.

3. The inspection system according to claim 1, wherein the at least one second processor performs third registering information of print job related to printing of the second image with the second image and the second configuration information indicating the configuration of second printing apparatus when the second image scanned from the second print product printed by the second printing apparatus is registered as the second reference image.

4. An inspection apparatus:
a first inspection apparatus comprising:
a memory; and
at least one first processor in communication with the memory, wherein the at least one first processor is configured to perform inspecting print quality of a first print product based on a comparison between a first image scanned from the first print product printed by a first printing apparatus and a first reference image; and
a second inspection apparatus comprising:
a memory; and
at least one second processor in communication with the memory, wherein the at least one second processor is configured to perform inspecting print quality of a second print product based on a comparison between a second image scanned from the second print product printed by a second printing apparatus and a second reference image, wherein the at least one first processor is configured to perform registering information of a print job related to printing of the first image with the first image and first configuration information indicating configuration of the first printing apparatus when the first image scanned from the first print product printed by the first printing apparatus is registered as the first reference image, wherein the at least one second processor is configured to perform registering the second reference image by importing the first reference image registered in the first inspection apparatus, and wherein the at least one second processor is configured to perform controlling whether the first reference image is registered as the second reference image by reversing a front and back of the first reference image or registered as the second reference image without reversing the front and back of the first reference image based on the information of the print job with the first image and second configuration information indicating configuration of the second printing apparatus.

5. A control method for controlling an inspection system including a first inspection apparatus inspecting print quality of a first print product based on a comparison between a first image scanned from the first print product printed by a first printing apparatus and a first reference image, and a second inspection apparatus inspecting print quality of a second print product based on a comparison between a second image scanned from the second print product printed by a second printing apparatus and a second reference image, the control method comprising:

first registering, by the first inspection apparatus, information of a print job related to printing of the first image with the first image and first configuration information indicating configuration of the first printing apparatus when the first image scanned from the first print product printed by the first printing apparatus is registered as the first reference image, second registering, by the second inspection apparatus, the second reference image by importing the first reference image registered in the first inspection apparatus, and controlling, by the second inspection apparatus, whether the first reference image is registered as the second reference image by reversing a front and back of the first reference image or registered as the second reference image without reversing the front and back of the first reference image based on the information of the print job with the first image and second configuration information indicating configuration of the second printing apparatus.

6. The control method according to claim 5, wherein the second inspection apparatus registers the first reference image as the second reference image by reversing the front and back of the first reference image in a case where a discharge destination indicated by the information of the print job is a predetermined sheet discharge destination and the first configuration information and the second configuration information are different configurations with respect to a presence or absence of a sheet reversing unit provided on a conveyance path to the predetermined sheet discharge destination.

7. The control method according to claim 5, wherein the second inspection apparatus registers information of a print job related to printing of the second image with the second image and the second configuration information indicating the configuration of second printing apparatus when the second image scanned from the second print product printed by the second printing apparatus is registered as the second reference image.

8. A non-transitory computer-readable storage medium storing program to cause a computer to perform a control method for controlling an inspection system including a first inspection apparatus inspecting print quality of a first print product based on a comparison between a first image scanned from the first print product printed by a first printing apparatus and a first reference image, and a second inspection apparatus inspecting print quality of a second print product based on a comparison between a second image scanned from the second print product printed by a second printing apparatus and a second reference image, the control method comprising:

first registering, by the first inspection apparatus, information of a print job related to printing of the first image with the first image and first configuration information indicating configuration of the first printing apparatus when the first image scanned from the first print product printed by the first printing apparatus is registered as the first reference image, second registering, by the second inspection apparatus, the second reference image by importing the first reference image registered in the first inspection apparatus, and controlling, by the second inspection apparatus, whether the first reference image is registered as the second reference image by reversing a front and back of the first reference image or registered as the second reference image without reversing the front and back of the first reference image based on the information of the print job with the first image and second configuration information indicating configuration of the second printing apparatus.

* * * * *